US 12,249,153 B2

(12) United States Patent
Hartmann et al.

(10) Patent No.: US 12,249,153 B2
(45) Date of Patent: Mar. 11, 2025

(54) METHOD AND DEVICE FOR RECOGNIZING AND EVALUATING ROADWAY CONDITIONS AND WEATHER-RELATED ENVIRONMENTAL INFLUENCES

(71) Applicant: Continental Teves AG & Co. oHG, Frankfurt (DE)

(72) Inventors: Bernd Hartmann, Bad Homburg (DE); Manuel Amthor, Jena (DE); Joachim Denzler, Jena (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 882 days.

(21) Appl. No.: 17/019,824

(22) Filed: Sep. 14, 2020

(65) Prior Publication Data

US 2020/0406897 A1 Dec. 31, 2020

Related U.S. Application Data

(63) Continuation of application No. PCT/DE2019/200016, filed on Feb. 26, 2019.

(30) Foreign Application Priority Data

Mar. 13, 2018 (DE) ...................... 10 2018 203 807.4

(51) Int. Cl.
*B60W 40/02* (2006.01)
*B60W 40/06* (2012.01)
(Continued)

(52) U.S. Cl.
CPC ............ *G06V 20/56* (2022.01); *B60W 40/06* (2013.01); *G06N 20/00* (2019.01); *G06V 10/60* (2022.01);
(Continued)

(58) Field of Classification Search
CPC ...... G06V 20/56; G06V 10/60; G06V 10/811; G06N 20/00; B60W 40/06;
(Continued)

(56) References Cited

U.S. PATENT DOCUMENTS 8,781,170 B2 * 7/2014 Mathieu ............... G01C 21/365
382/104
9,286,520 B1 * 3/2016 Lo ......................... G06V 20/58
(Continued)

FOREIGN PATENT DOCUMENTS

CN 1809853 A 7/2006
CN 107667378 A 2/2018
(Continued)

OTHER PUBLICATIONS

Notice of Reasons for Refusal dated Dec. 8, 2022 for the counterpart Japanese Patent Application No. 2020-519331.
(Continued)

*Primary Examiner* — Jonathan L Sample

(57) ABSTRACT

A method for classifying a roadway condition on the basis of image data from a camera system includes providing image data which is configured to image at least one portion of the surroundings of the vehicle, at least part of the portion containing the roadway on which the vehicle is driving. The method includes distinguishing diffuse reflection and specular reflection of the roadway by evaluating differences in the appearances of at least one point of the roadway in at least two images. The method also includes determining whether, in at least one image, there are disturbances that have been caused by at least one wheel of a vehicle whirling up a substance covering a roadway as said wheel travels thereover. The method further includes classifying the roadway condition into one of several roadway condition classes, (Continued)

taking account of the results with regard to the reflection type and the disturbance intensity.

23 Claims, 5 Drawing Sheets

(51) Int. Cl.
    *G06N 20/00*     (2019.01)
    *G06V 10/60*     (2022.01)
    *G06V 10/80*     (2022.01)
    *G06V 20/56*     (2022.01)

(52) U.S. Cl.
    CPC ..... *G06V 10/811* (2022.01); *B60W 2420/403* (2013.01); *B60W 2552/05* (2020.02); *B60W 2555/20* (2020.02)

(58) Field of Classification Search
    CPC ......... B60W 2555/20; B60W 2552/05; B60W 2420/42; B60W 2420/403; G06F 18/256
    USPC ...................................................... 701/23–28
    See application file for complete search history.

(56) References Cited

U.S. PATENT DOCUMENTS

| | | | |
|---|---|---|---|
| 10,562,412 B1* | 2/2020 | Main ....................... | B60N 2/643 |
| 2005/0073583 A1* | 4/2005 | Moisel ..................... | B60R 1/24 |
| | | | 348/148 |
| 2006/0261975 A1* | 11/2006 | Fridthjof ................. | B60T 8/172 |
| | | | 340/905 |
| 2011/0211071 A1* | 9/2011 | Kuehnle .............. | G06V 20/588 |
| | | | 348/149 |
| 2016/0379065 A1* | 12/2016 | Hartmann ............... | B60R 11/04 |
| | | | 348/148 |
| 2018/0059677 A1* | 3/2018 | Zhao ........................ | B60T 8/00 |
| 2018/0060676 A1* | 3/2018 | Hartmann .............. | G06V 20/56 |
| 2018/0141561 A1* | 5/2018 | Fritz ....................... | G06V 20/56 |
| 2018/0276832 A1* | 9/2018 | Aikin ...................... | H04N 23/56 |

FOREIGN PATENT DOCUMENTS

| | | |
|---|---|---|
| DE | 102005044486 A1 | 3/2007 |
| DE | 102016009928 A1 | 2/2017 |
| JP | 2014178843 A | 9/2014 |
| JP | 2017503715 A | 2/2017 |
| JP | 2017078972 A | 4/2017 |
| WO | 2014277777 | 2/2014 |
| WO | 2015070861 A1 | 5/2015 |
| WO | 2016177371 A1 | 11/2016 |
| WO | 2016177372 A1 | 11/2016 |

OTHER PUBLICATIONS

Written Opinion dated Jan. 25, 2023 for the counterpart Japanese Patent Application No. 2020-519331.
International Search Report and Written Opinion dated Jul. 5, 2019 from corresponding International Patent Application No. PCT/DE2019/200016.
German Search Report dated Feb. 25, 2019 for corresponding German Patent Application No. 10 2018 203 807.4.
Chinese Office Action dated Dec. 30, 2023 for the counterpart Chinese Patent Application No. 201980005798.X and translation of same.
Chinese Second Office Action dated Jun. 19, 2024 for the counterpart Chinese Patent Application No. 20198005798.X and machine translation of same.
Chinese Third Office Action dated Sep. 28, 2024 for the counterpart Chinese Patent Application No. 20198005798.X and machine translation of same.

* cited by examiner

METHOD AND DEVICE FOR RECOGNIZING AND EVALUATING ROADWAY CONDITIONS AND WEATHER-RELATED ENVIRONMENTAL INFLUENCES

CROSS REFERENCE TO RELATED APPLICATION

This application is a continuation of International application No. PCT/DE2019/200016, filed Feb. 26, 2019, which claims priority to German patent application No. 10 2018 203 807.4, filed Mar. 13, 2018, each of which is hereby incorporated by reference.

TECHNICAL FIELD

The technical field relates to a method for classifying a roadway condition on the basis of image data from a vehicle camera system and to a corresponding vehicle camera system.

BACKGROUND

Technological progress in the field of optical image acquisition allows the deployment of camera-based driver assistance systems which are located at different positions on the vehicle and capture the environment of the vehicle in the way the driver visually perceives it. The functionality of these systems ranges from automatic headlights to the recognition and display of speed limits, lane departure warnings, and imminent collision warnings.

Starting from just capturing the area in front of the vehicle to a full 360° panoramic view in the case of so-called surround view systems, cameras can now be found in various applications and different functions for driver assistance systems in modern vehicles. It is the primary task of digital image processing as a standalone function or in conjunction with radar or lidar sensors to recognize, classify, and track objects in the image portion. Classic objects generally include various vehicles such as cars, trucks, two-wheel vehicles, or pedestrians. Furthermore, cameras capture signs, lane markings, guardrails, free spaces, or other generic objects.

Automatic learning and recognition of object categories and their instances is one of the most important tasks of digital image processing. Many methods for this purpose are known. Due to the methods which are now very advanced and which can perform these tasks almost as well as a person, the focus has now shifted from a coarse localization to a precise localization of the objects.

Modern driver assistance systems deploy different sensors including video cameras to capture the entire vehicle environment as accurately and robustly as possible. This environmental information, together with driving dynamics information from the vehicle (e.g. from inertia sensors), provide a good impression of the current driving state of the vehicle and the entire driving situation. This information can be used to derive the criticality of driving situations and to initiate the respective driver information/alerts or driving dynamic interventions through the brake and steering system.

However, since the available friction coefficient or roadway condition was not provided or could not be designated in driver assistance systems to date, the times for issuing an alert or for intervention are in principle determined on the basis of a dry roadway with a high adhesion potential between the tire and the roadway. The friction coefficient, also known as the friction value, adhesion coefficient, coefficient of (static) friction or coefficient of friction indicates which maximum force can be transferred with respect to the wheel load between a roadway surface and a vehicle tire (e.g. in the tangential direction) and is consequently a fundamental measure of driving safety. In addition to the roadway condition, the properties of the tire are required to completely establish the friction coefficient.

This presents a real challenge for driver assistance systems, but also for automated driving. Accident-preventing or impact-weakening systems warn the driver or intervene so late that accidents are prevented or accident impacts acceptably weakened only if the road is really dry. If, however, the road provides less adhesion due to moisture, snow, or even ice, an accident can no longer be prevented and the reduction of the impact of the accident does not have the desired effect.

If the driver were in a position, thanks to the system, to establish the roadway condition or even the available friction coefficient, driver alerts and also system interventions could be carried out accordingly in a more targeted manner. The effectiveness of accident-preventing driver assistance systems would be significantly increased. Monitoring the roadway conditions or respectively estimating the friction coefficient is a fundamental prerequisite for automated driving systems.

WO 2014/127777 A2, for example, discloses an image-based establishment of a roadway condition by means of a vehicle camera. Here, an image section which comprises a mapping of the roadway surface is fed to a classifier.

It is an object of the invention to indicate an improved camera-based classification of the roadway conditions and, if necessary, any weather-related environmental influences that occur.

A starting point of the present solution is the realization that a distinction according to diffuse and specular reflections on the roadway surface in camera image data is characteristic of specific roadway conditions. Such a method is described in WO 2016/177371 A1.

As such, it is desirable to present xxxx. In addition, other desirable features and characteristics will become apparent from the subsequent summary and detailed description, and the appended claims, taken in conjunction with the accompanying drawings and this background.

BRIEF SUMMARY

In particular, in a combination of various cameras and camera systems on the vehicle which have different viewing angles and viewing directions, it is possible to first distinguish according to diffuse and specular reflections on the roadway surface in images or in subsections of the images or in a sequence of images with digital image processing and machine learning means. For example, an individual camera which assumes different viewing angles of a point in space as a consequence of the movement of the vehicle at different times offers different viewing angles. As a further example, two cameras having a partially overlapping capture area already offer, at one time, different viewing angles of a point in space in the overlapping area.

A second fundamental characteristic of the condition of a roadway surface is provided by the determination of disturbances in images or in subsections of the images or in a sequence of images, which arise due to a substance covering a roadway (e.g., water or snow) being whirled up as the vehicle wheels of the ego vehicle or the wheels of other vehicles drive thereover or respectively as a consequence of the travel by these thereover. The substances covering a roadway can be evaluated according to their effect in the image. Particles of the substance covering the roadway whirled up by vehicle wheels occasion disturbances in the image or respectively in the subsections of images or respectively in the sequence of images to varying degrees. Such a method is described in WO 2015/070861 A1.

Both characteristics can now be linked to one another and can be allocated jointly to a precisely defined roadway condition. As a result, a distinction of the following five relevant roadway conditions can be guaranteed solely on the basis of camera images:

dry roadway
wet roadway with little water
wet roadway with a great deal of water (risk of aquaplaning)
snowy roadway
icy roadway.

The distinction is made based on the following simple criteria:

dry roadway: diffuse reflection, in which no disturbance is caused by the vehicle wheels;
wet roadway with little water: specular reflection with few disturbances;
wet roadway with a great deal of water (risk of aquaplaning): specular reflection with much disturbance;
snowy roadway: diffuse reflection with disturbance; and
icy roadway: specular reflection without disturbance.

A disturbance on a wet roadway which is occasioned by splash water may be recognized in that brightness and/or contrast and/or color and structural differences are produced, compared with an undisturbed image or respectively with undisturbed subsections of the image or in the sequence of undisturbed images.

On the other hand, no brightness and/or contrast and/or color differences are produced on snow. The whirled-up snow simply produces structural differences.

A dry roadway is in particular distinguished by a diffuse reflection without disturbances.

The icy roadway (black ice) typically shows a specular reflection without disturbance.

The method can in principle be applied to individual cameras provided that they are suitable for capturing substances whirled up by the wheels of the ego vehicle or other vehicles. That is to say, the camera system may include an individual camera provided that this has a suitable capture area, in which disturbances are detected (if these occur) and in which the type of the reflection can be established.

This may apply, e.g., to a (monocular) vehicle front-facing camera which captures the roadway lying in front at least partially and can then recognize a substance covering a roadway if a vehicle driving ahead, a traversing or an oncoming vehicle whirls up the substance covering the roadway, e.g., in the form of splash water or clouds of snow, as the tires drive thereover.

A laterally arranged camera, that is to say, e.g., a camera directed at a wheel of the ego vehicle, a side of the ego vehicle, or at least one area surrounding the wheel may produce the image data. In other words, at least one wheel or the wheel well which surrounds this one wheel, or a side of the vehicle is located in the field of view (FOV) of the side camera. This applies, e.g., to a first side camera of a surround view camera system. The image region (region of interest, ROI) to be evaluated may relate to the space around the front wheel on this side where the effect of splash water or whirled-up snow occurring is greatest. Alternatively, or respectively additionally, the space around the rear wheel can serve as the (second) ROI.

In other words, in the at least one region of particular interest (ROI), image disturbances that are caused by the vehicle wheel observed close to the wheel whirling up the substance covering the roadway as said wheel travels thereover are determined, which results in disturbances in the at least one region of particular interest (ROI).

According to a further embodiment, a second laterally arranged camera on the opposite vehicle side produces second image data in a comparable manner. Thus, both front wheels and/or both rear wheels can be "monitored".

The vehicle camera system may include a rearview camera which captures an area at the back of the vehicle.

Image data from different individual cameras of a vehicle camera system having different viewing directions and/or angles are provided. As a result, the reflection type of the roadway can be distinguished more robustly. The disturbance intensity can also be established more robustly.

A surround view camera system having at least or precisely four wide-angled (up to 180° viewing angle) cameras, which capture the areas at the front, on the left, on the right and at the rear with regard to the vehicle and its surroundings, would offer ideal possibilities for robustly detecting the reflection type and disturbance.

Camera images may be subdivided into multiple different regions of particular interest (ROIs) which, depending on the content, are deliberately utilized in different ways in order to evaluate the reflection type and disturbance.

Individual cameras may be deliberately utilized in different ways in order to evaluate the reflection type and disturbance. For example, a side camera can be utilized in order to evaluate the disturbance in the area of the wheel and a front-facing or a rearview camera can be utilized in order to establish the reflection type.

One advantage of a combination of various cameras and image regions is that it is possible to look, in a very deliberate manner, for the disturbances due to the vehicle wheel-related turbulences of the substance covering the roadway in the various images and/or regions. Such a combination makes the total result considerably more robust and increases the availability of information.

A further advantageous manifestation involves combining one or more front-facing camera(s) with the cameras of a surround view system. The front-facing camera offers a better resolution (and lower distortion) for (more distant) surrounding areas lying in front than a forward-facing satellite camera of a surround view camera system.

Driving dynamics and/or other sensor data and/or environment information of other non-camera-based environment sensors of a vehicle and/or weather information may be enlisted as an additional decision-making basis for evaluating or respectively classifying the roadway condition and the weather-related environmental influences.

In order to distinguish the roadway conditions, a first machine learning method may be trained based on a first random training sample. The first machine learning method comprises the steps of:

detection and/or classification of the reflection type; and
detection and/or regression of the disturbance intensity.

According to one embodiment, a mapping of the reflection type and disturbance intensity on one of the roadway condition classes is learnt with the aid of a second machine learning method based on a second random training sample.

Image features from the at least one region may be extracted from the at least one camera image, optionally converted into an intermediate representation, and by means of a regressor mapped on a disturbance intensity, or by means of a classifier mapped on a reflection type and/or a roadway condition.

Alternatively, a neural network is trained, which learns a mapping of one or more image portions from one or more camera images on roadway conditions based on a third random training sample. Said end-to-end classifying can in particular be affected as a deep learning method, the neural network can be a convolutional neural network (CNN).

Driving dynamics and/or sensor data may be used as an additional input for a machine learning method or respectively training of a neural network.

In addition, a vehicle camera system comprising at least one camera and an image data evaluation unit is also disclosed.

The camera is configured (in particular arranged and is actuated) to image at least one portion of the surroundings of the vehicle, at least part of the portion containing the roadway on which the vehicle is driving, and to provide the image data to the image data evaluation unit. The image data evaluation unit is configured to distinguish between diffuse reflection and specular reflection of the roadway by evaluating differences in the appearances of at least one point of the roadway in at least two images from the camera system that have been recorded from different recording perspectives.

The image data evaluation unit is additionally configured to determine whether, in at least one image from the camera system, there are disturbances that have been caused by one wheel of a vehicle whirling up a substance covering a roadway as said wheel travels thereover. The image data evaluation unit is additionally configured to classify the roadway condition into one of the following five roadway condition classes, taking account of the results of the reflection type and disturbance intensity:

a) dry roadway: diffuse reflection type without disturbance,
b) normally wet roadway: specular reflection type with disturbance,
c) very wet roadway with risk of aquaplaning: specular reflection type with much disturbance,
d) snowy roadway: diffuse reflection type with disturbance,
e) icy roadway (black ice): specular reflection type without disturbance.

In particular, the vehicle camera system is set up to detect roadway conditions such as dry, wet, snowy, icy and hazardous situations such as for example aquaplaning robustly, using digital image processing and machine learning algorithms, and to robustly distinguish these by cross-checking the reflection type of the roadway and disturbance intensity.

The image data evaluation unit may in particular comprise a microcontroller or processor, a digital signal processor (DSP), an ASIC (Application Specific Integrated Circuit), a FPGA (Field Programmable Gate Array) and more of the same as well as software for performing the corresponding method steps.

The present invention can consequently be implemented in digital electronic circuits, computer hardware, firmware or software.

The vehicle camera system can additionally comprise an output unit for informing the driver or for controlling a (partially or completely) automatically driving vehicle.

A computing unit for evaluating the friction coefficient can be integrated into the vehicle camera system or respectively into the image data evaluation unit.

A further subject-matter of the disclosure relates to a vehicle having a vehicle camera system according to the invention. The vehicle preferably comprises actuators for intervening in the driving dynamics of the vehicle, which are actuated by the vehicle camera system in accordance with the determined roadway condition.

BRIEF DESCRIPTION OF THE DRAWINGS

Exemplary embodiments and figures are described in greater below, wherein.

DETAILED DESCRIPTION

Figure 1:
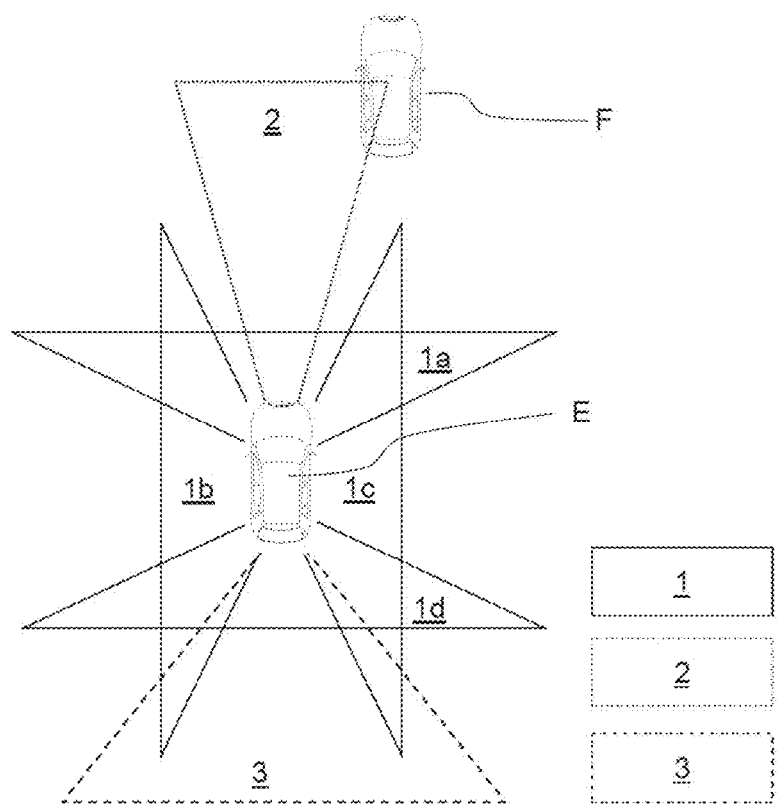
FIG. 1 shows different capture areas of a vehicle camera system having multiple individual cameras.

FIG. 1 shows the capture areas 1a-1d, 2, 3 of a camera system arranged in or respectively on a first vehicle E. A second vehicle F is located laterally offset in the direction of travel in front of the first vehicle E. The camera system of the first vehicle E includes three different camera subsystems 1, 2, 3: a surround view system 1 comprising four individual camera sensors with wide-angled capture areas 1a-1d which, together, make it possible to capture a 360° view of the vehicle, a front-facing camera having a forward-facing capture area 2 and a rearview camera having a backward-facing capture area 3.

Disturbances in the image or respectively in an image portion which occur in the presence of a substance covering a roadway when the roadway is driven over by vehicles driving ahead F or by oncoming vehicles (not depicted) can be detected or determined with camera sensors which have a forward-facing capture area 1a, 2 in the direction of travel.

The image processing for determining a substance covering a roadway can be advantageously restricted to one or more sections of the camera image, in which a tire contact zone with the roadway is located.

Disturbances in the image due to a substance covering a roadway when the roadway is driven over by the tires of the ego vehicle E can be determined with camera sensors which have a sideways-facing capture area 1b, 1c.

The advantage of this is that the driver is not reliant on third-party vehicles F driving ahead or on the offset lane, but rather he is able to determine a currently relevant substance covering a roadway based on the detection and determination of the repercussions caused by the ego vehicle E based on laterally aligned sensor technology, independently of other vehicles F. Since vehicles are now already increasingly being equipped with 360° camera sensor technology that captures a surround view which can be displayed to the driver, e.g., as a "top view" in a bird's eye view, the reliable determination of a substance covering a roadway can advantageously be guaranteed.

Figure 2:
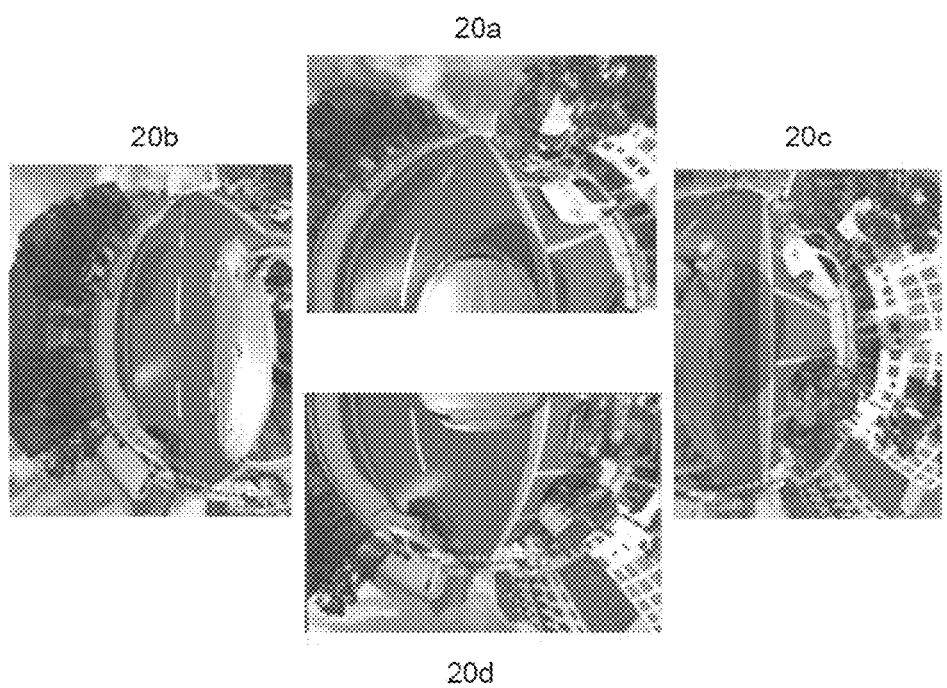
FIG. 2 shows four individual images of a surround view camera system having four cameras with fish-eye optics.

FIG. 2 shows, by way of example, four individual images of a surround view camera system having four cameras with fish-eye optics. The images at the top 20a, on the left 20b, on the right 20c, and at the bottom 20d correspond to the capture areas at the front 1a, on the left 1b, on the right 1c, and at the rear 1d depicted in FIG. 1. The respective front and rear wheels are in particular contained in the images of the left 20b and right 20c side cameras. The corresponding image sections or respectively ROIs may be selected and fed to a classification which determines an intensity of image disturbances in said sections by virtue of substances covering the roadway.

Figure 3:
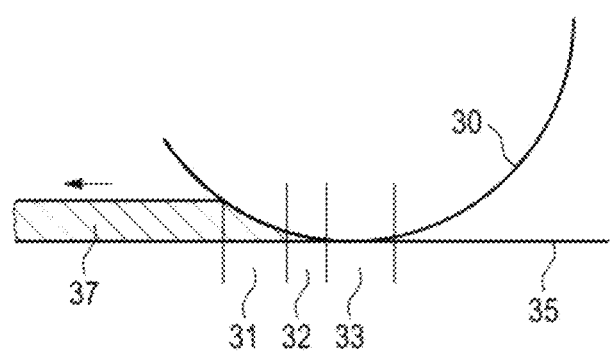
FIG. 3 shows a schematic view of a vehicle tire in extremely wet conditions.

FIG. 3 shows a schematic view of a situation having an aquaplaning hazard. The contact between a tire 30 and a roadway 35 is crucial. The water 37 located on the roadway 35, that is to say the substance covering the roadway, is depicted in a hatched manner. The contact surface of the tire 30 with the roadway 35 can be divided into three sections 31-33. If the vehicle and, consequently, also the tire 30 is moving in the direction of travel identified by the direction of the arrow, an approach zone 31, in which water is located in a wedge shape between the tire 30 and the roadway 35, first forms on the tire. Joined to said approach zone 31 is a transition zone 32. In the area of the contact zone 33 which joins the transition zone 32, the tire 30 is in direct contact with the roadway 35, as a result of which a corresponding adhesion effect can be achieved. As the water level increases and/or the driving speed increases, the contact zone 33 and, thus, the contact surface between the tire 30 and roadway 35 reduces. If this extension of the contact zone 33 tends towards zero, there is an immediately imminent risk of aquaplaning. This condition is therefore referred to as micro-aquaplaning. If there is no longer a contact zone 33, that means water is located between the tire 30 and the roadway 35 in the entire area, aquaplaning occurs and a vehicle can no longer be controlled or braked in a controlled manner during said condition.

Figure 4:
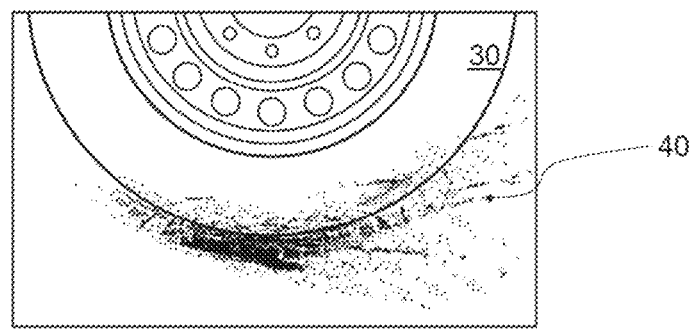
FIG. 4 schematically shows a binarized camera image of a vehicle tire when driving over a rain-wet roadway.

In FIG. 4, a black and white (inverted) mapping of a camera image of a vehicle tire 30 as it drives over a rain-wet roadway is depicted. The vehicle tire 30 is located on a wheel rim (white, circular) and the vehicle is moving left. Water drops and water rivulets 40 (white points and rivulets), which are displaced and accelerated by the tire as said tire drives over the roadway surface covered with water, can be recognized. When driving over wet roads, splash water does of course form, starting from the vehicle tires. Due to the high surface pressure, the tire displaces the water standing on the roadway on all sides. The phenomenon is particularly pronounced in the case of trucks, the tires of which have a correspondingly higher surface pressure and have to displace more water than cars. The splash water is mainly located, viewed in the direction of travel, behind and laterally next to the vehicle tire. It can be detected there by a vehicle camera and can be recognized as splash water by image processing, from which it can be concluded that the substance covering the roadway is a layer of rainwater.

If slush is present on the roadway, spray slush is produced in a comparable manner, which can be detected and recognized as such.

Depending on the substance covering the roadway, e.g., in the case of a damp instead of a wet roadway, and the structure of the roadway surface, no splash water occurs during driving over, but instead only spray mist or spray or both. When driving over roads covered with new snow or powder snow, swirling of snow typically occurs which spreads out over the vehicle sides and over the vehicle rear as a snow banner.

Consequently, each substance covering the roadway that is whirled up results in disturbances in the image section close to a wheel and can be identified based on the intensity of said disturbances.

Figure 5:
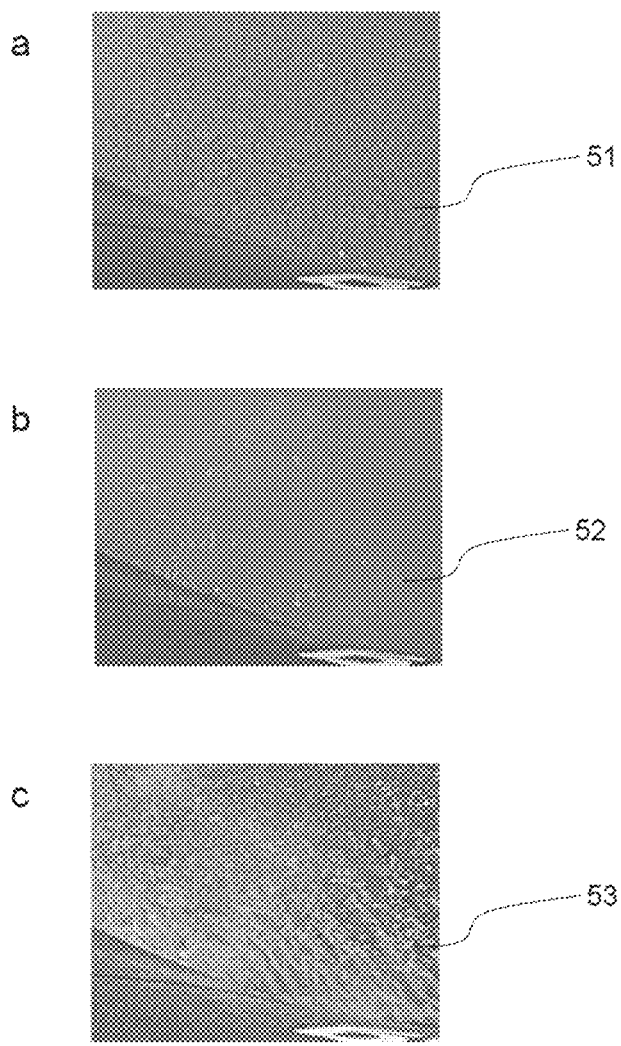
FIG. 5 shows three example image portions of a right vehicle side camera for one class respectively of a disturbance intensity with a roadway having varying degrees of wetness.

FIG. 5 shows three example image portions of a (right) vehicle side camera with a roadway having different degrees of wetness.

FIG. 5a shows a dry roadway, in which in the area 51 adjoining the vehicle side (at the bottom) the roadway surface is mapped and the structure thereof is undisturbed in the image and can consequently be recognized.

FIG. 5b shows a normally wet roadway, in which the imaging of the roadway surface is disturbed by individually recognizable splash water drops 52.

FIG. 5c shows a very wet roadway (cf. FIG. 3), in which there is an acute aquaplaning hazard. The roadway surface can hardly be recognized here, since considerable splash water spray 53 results in serious disturbances in said image section.

Figure 6:
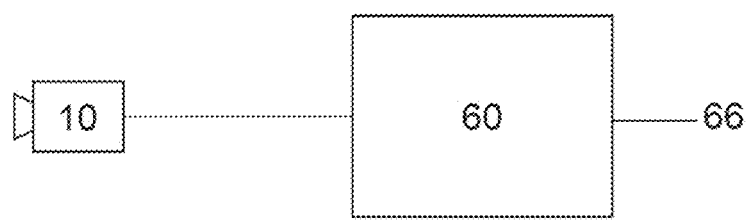
FIG. 6 shows a schematic view of a vehicle camera device.

FIG. 6 shows a schematic view of a vehicle camera device comprising at least one camera 10 and an image data evaluation unit 60. The image data evaluation unit 60 determines the reflection type and the disturbance intensity and can thus classify the roadway condition. The roadway condition class can be output to vehicle actuators 66, a driver warning apparatus or a driver assistance function control unit.

Figure 7:
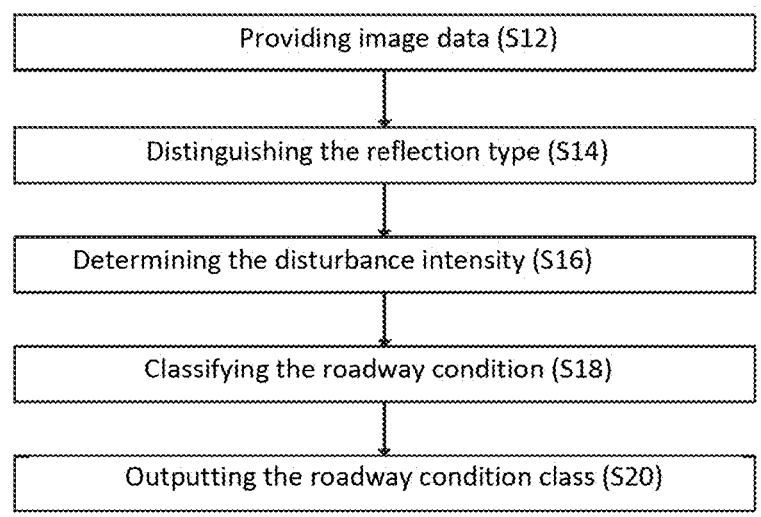
FIG. 7 shows a schematic diagram of steps of a method for recognizing and evaluating roadway conditions.

FIG. 7 shows a schematic diagram of steps of a method for recognizing and evaluating roadway conditions.

In step S12, image data are provided by a vehicle camera system. In step S14, it is distinguished based on the image data whether diffuse or specular reflection exists due to the roadway surface or respectively a substance covering a roadway.

In step S16, the intensity of disturbances in an image section is determined. In step S18, the roadway condition is classified based on the results of the steps S14 and S16.

The roadway condition class is output in an optional step S20.

Digital Image Processing and Machine Learning Methods:

An advantageous embodiment uses digital image processing and machine learning algorithms, with the objective of robustly detecting roadway reflections in conjunction with substances covering a roadway potentially being whirled up such as water or snow, in order to recognize roadway conditions such as dry, wet, snowy, icy and hazardous situations such as, for example, aquaplaning. The method is suitable in extracts both for mono, stereo and surround view cameras and/or a combination thereof.

One or more regions in one or more camera images, which can be statistically specified or automatically established by e.g. machine learning, form the basis thereof. The important thing here is that the image regions provide information regarding the reflection type and regarding the existence or non-existence of substances covering the roadway being whirled up, or that the combination of multiple image regions and/or multiple cameras having multiple image regions provide information regarding the reflection type and regarding the existence or non-existence of substances being whirled up, which lead to disturbances in the image regions.

In order to detect roadway reflections, one or more regions in one or more camera images are used, which represent(s) the roadway surface. Depending on the running time and accuracy requirements, this can be a segmented portion or, in a particularly advantageous embodiment, a trapeze which is transformed with the aid of estimated homography into a rectangular top view ("bird's-eye view"). As introduced in WO 2016/177371 A1, various roadway reflection types (diffuse and specular reflections) can now be established, e.g., from the temporal context.

In order to detect the substance covering the roadway being whirled up, regions are specified in one or more camera images. In a particularly advantageous form, these are the image portions in a surround view camera system in the vicinity of the vehicle wheels and/or the vehicle bodywork from a lateral view. Consequently, any substances which may be whirled up can be deliberately established in a restricted area free from disrupting influences from the vehicle environment. The detection of vehicle wheels and/or wheel portions in the scene (ego and also third-party vehicles) by means of machine learning presents a further possibility. During this, a detector which supplies the desired image portion can be trained.

The classification into one of the given roadway condition classes constitutes a central aspect. The detected image portions serve as a basis for the substance covering the roadway which may potentially be whirled up and the information regarding the current reflection type on the roadway. Said data are then fed to a machine learning system which, based on a random training sample, learns a mapping of image portions, reflection type and additional information on one of the defined roadway conditions. That is to say, a model is formed which, on the one hand, extracts/learns structure-based features in order to describe the substance covering the roadway being whirled up and, on the other hand, estimates a suitable combination of these and the reflection type and/or additional information.

TABLE 1

Classification of the roadway conditions by cross-checking the reflection type and degree of disturbance

| Reflection/Disturbance | None | Normal | Severe |
|---|---|---|---|
| Diffuse | Dry | Snow | — |
| Specular | Black ice | Normally wet | Aquaplaning hazard |

Furthermore, the classification can be supported by context knowledge/additional information. The integration of driving dynamics data of the vehicle as well as the use of available sensor data (temperature, air humidity, rain sensor, windscreen wiper activity, etc.) are particularly suitable for this.

Fisher Vector Encoding with Front View and Surround View Camera System:

The proposed methodology utilizes, as an input, one or more camera images which include(s) the important section in the image for the decision and, at the same time, excludes the unnecessary background. This is important since the method can be adversely affected by disturbances of the surrounding infrastructure and other road users.

Due to an image portion being selected which is too large, it is even possible with a very small database for the decision not to be made based on the desired whirled-up structures of the substance covering the roadway, but based on background appearances which randomly occur in the individual situations.

Local features are then extracted from the input image sections of all the training images on a dense grid, which describe parts of the image by an edge histogram (inter alia HOG "Histogram of oriented gradients", LBP "Local binary patterns"). Subsequently, a Gaussian mixture distribution model is estimated from the entire quantity of features. An individual image is then described based on higher-order statistics from the feature vectors thereof and the mixture distribution model, so-called Fisher vector encoding. With the aid of the obtained image representations of the entire training quantity, a linear classifier is finally taught which supplies probabilistic class affiliations for a given image at run time.

A particularly advantageous form is the use of two image regions from the front-facing camera and the use of image portions of the surround view cameras. A first image section of the front-facing camera serves to standardize existing reflections on the lane. Furthermore, a further larger image portion provides a global image context to weather conditions and effects of relevance to roadway conditions, which are caused by the infrastructure (for example snowy footpaths or a level green shoulder). The image portions of the surround view camera, on the other hand, provide information regarding substances covering the roadway that are whirled up. The combination of these image portions from different cameras can then serve as an input for the Fisher vector encoding.

Thanks to the encoding, characteristic structures for the whirling up and the relationship of these to reflection information and additional information can, on the one hand, be mapped. Structural features in front of and next to the vehicle can additionally be captured which can likewise be helpful in distinguishing the roadway conditions (lanes in the case of a snowy roadway).

The classification result can, if required, be stabilized by subsequent processing in that the estimates from the individual images can be smoothed out over time. Alternatively, a hysteresis threshold method can also filter an unsafe decision.

Deep Learning with Front View and Surround View Camera System:

Like the method for estimating the roadway condition by means of Fisher vector encoding (see above), traditional machine learning consists of multiple steps which are executed independently of one another. Firstly, features are extracted from the image, which are either utilized directly or converted into an intermediate representation. Subsequently, a classifier is taught, which makes a class decision based on the features or the intermediate representation.

In contrast thereto, during deep learning, the individual steps are not explicitly executed, but rather take place implicitly with growing depth in a neural network. This is referred to as so-called end-to-end learning which results in a joint optimization of all of the parameters in a system. This means for the present invention that image portions or entire images from front view and surround view cameras serve as the input for the neural network. Additionally, the reflection type and additional information, such as sensor and driving dynamics data, can be integrated as an input. Based on a random training sample, the network is then trained without explicitly modelling a feature extraction or intermediate representation. A mapping of input data on the associated roadway condition is simply learnt.

The present disclosure has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for recognizing and evaluating roadway conditions and weather-related environmental influences, comprising:
   providing image data utilizing a vehicle camera system which is configured to image at least one portion of surroundings of a vehicle, wherein at least part of the one portion includes the roadway on which the vehicle is driving;
   distinguishing, by controller circuitry, diffuse reflection and specular reflection of the roadway by evaluating differences in appearance of at least one point of the roadway in at least two images from the camera system, the at least two images having been recorded from different recording perspectives;
   determining, by the controller circuitry, whether, in at least one image from the camera system, there are disturbances that have been caused by at least one vehicle wheel whirling up a substance covering a roadway as the at least one vehicle wheel travels thereover,
   classifying, by the controller circuitry, the roadway conditions into one of the following five roadway condition classes, taking account of results with regard to reflection type and disturbance intensity:
   a) dry roadway: diffuse reflection type without disturbance,
   b) normally wet roadway: specular reflection type with disturbance,
   c) very wet roadway with risk of aquaplaning: specular reflection type with much disturbance,
   d) snowy roadway: diffuse reflection type with disturbance,
   e) icy roadway (black ice): specular reflection type without disturbance, and
   at least one of alerting a driver of the roadway condition classification by controlling a display of the vehicle to visually present an alert based upon the roadway condition classification, or controlling a vehicle actuator to intervene in driving dynamics of the vehicle based upon the roadway condition classification.

2. The method according to claim 1, wherein the at least one vehicle wheel is a wheel of the vehicle, and the vehicle camera system is configured to capture at least a part of a space around the at least one vehicle wheel and determine whether, in at least one section of the at least one image, there are disturbances that have been caused by the at least one vehicle wheel of the vehicle whirling up the substance covering the roadway as the at least one vehicle wheel travels thereover.

3. The method according to claim 2, wherein the vehicle camera system includes a first side camera.

4. The method according to claim 3, wherein the vehicle camera system includes a second side camera arranged on an opposite side of the vehicle as the first side camera.

5. The method according to according to claim 2, wherein the vehicle camera system includes a vehicle rearview camera.

6. The method according to claim 5, wherein the vehicle camera system includes a vehicle front-facing camera.

7. The method according to claim 1, wherein image data being provided from different individual cameras of the vehicle camera system having different viewing directions and/or angles.

8. The method according to claim 1, further comprising subdividing, by the controller circuitry, the at least two camera images into multiple different regions of particular interest which, depending on content of the at least two camera images, are utilized in different ways in order to evaluate the reflection type and disturbance.

9. The method according to claim 1, further comprising utilizing, by the controller circuitry, individual cameras in different ways in order to evaluate the reflection type and disturbance.

10. The method according to claim 1, wherein the vehicle camera system has a capture area located in front of the vehicle, and image disturbances that have been caused by the substance covering the roadway being whirled up as a second vehicle driving in front of the vehicle, a traversing vehicle or an oncoming vehicle driving over the roadway.

11. The method according to claim 1, further comprising enlisting, by the controller circuitry, at least one of driving dynamics, other sensor data, or environment information of other non-camera-based environment sensors of the vehicle as an additional decision-making basis for evaluating the roadway conditions and weather-related environmental influences.

12. The method according to claim 1, further comprising, in order to distinguish the roadway conditions, training a machine learning system based on a random training sample, comprising:
   at least one of detecting or classifying the reflection type; and
   performing at least one of detection or regression of the disturbance intensity.

13. The method according to claim 12, wherein training the machine learning system further comprises learning a mapping of the reflection type and the disturbance intensity on one of the roadway condition classes based on the random training sample.

14. The method according to claim 10, further comprising:
   extracting image features from at least one region of at least one camera image; and
   mapping by a regressor the disturbance intensity or by a classifier at least one of the reflection type or the roadway conditions.

15. The method according to claim 1, further comprising training a neural network which learns a mapping of one or more image portions from one or more camera images on the roadway conditions based on a random training sample.

16. A vehicle camera system comprising at least one camera and an image data evaluation unit,
   wherein the camera is configured to image at least one portion of surroundings of the vehicle, at least part of the portion containing the roadway on which the vehicle is driving, and to provide the image data to the image data evaluation unit; and
   wherein the image data evaluation unit comprises controller circuitry and is configured
      to distinguish, by the controller circuitry, between diffuse reflection and specular reflection of the roadway by evaluating differences in appearance of at least one point of the roadway in a sequence of at least two images from the camera system,
      to determine, by the controller circuitry, whether, in at least one image from the camera system, there are disturbances that have been caused by a vehicle wheel whirling up a substance covering a roadway as the vehicle wheel travels thereover, to classify, by the controller circuitry, roadway condition into one of five roadway condition classes, taking account of results of reflection type and disturbance intensity:
   a) dry roadway: diffuse reflection type without disturbance,
   b) normally wet roadway: specular reflection type with disturbance,
   c) very wet roadway with risk of aquaplaning: specular reflection type with much disturbance,
   d) snowy roadway: diffuse reflection type with disturbance,
   e) icy roadway (black ice): specular reflection type without disturbance, and
wherein the vehicle comprises a partially or fully automated driving vehicle, and the vehicle camera system further comprises an output unit, the output unit comprising digital electronic circuitry, computer hardware, firmware and/or software configured to at least one of initiate an alert to a driver of the roadway condition classification by controlling a warning apparatus to issue the alert based upon the roadway condition classification, or initiate actuation of a vehicle actuator to intervene in driving dynamics of the vehicle based upon the roadway condition classification.

17. The system according to claim 16, wherein the image data evaluation unit is configured to divide, by the controller circuitry, camera images from the camera into multiple different regions of particular interest which, depending on content of the camera images, are utilized in different ways in order to evaluate the reflection type and disturbance.

18. The system according to claim 16, wherein the driver assistance system of the vehicle receives the roadway condition classification from the evaluation unit, and the system comprises the driver assistance system having driver assistance control circuitry which is configured to at least partly control a driving operation of the vehicle based in part upon the received roadway condition classification.

19. The method according to claim 1, wherein the driver assistance system of the vehicle receives the roadway condition classification from the controller circuitry and the method further comprises at least partly controlling, by control unit circuitry of the driver assistance system, a driving operation of the vehicle based in part upon the roadway condition classification.

20. A vehicle driving system, comprising:
an image data evaluation unit comprising processor circuitry and configured to:
   receive, by the processor circuitry, images captured by at least one camera secured to a vehicle, the images including at least a portion of a surrounding of the vehicle and depicting at least a roadway on which the vehicle is driving;
   determine, by the processor circuitry, reflection type by distinguishing between diffuse reflection and specular reflection of the roadway depicted in the received images by evaluating differences in appearance of at least one point of the roadway in a sequence of at least two first images received;
   determine, by the processor circuitry, disturbance intensity by determining whether, in at least one second image, there are depicted disturbances that have been caused by a vehicle wheel displacing a substance covering a roadway as the vehicle wheel travels thereover;
   classify, by the processor circuitry, a roadway condition of the roadway into one of five roadway condition classes, based in part on reflection type and disturbance intensity:
      a) dry roadway having diffuse reflection type without disturbance,
      b) normally wet roadway having specular reflection type with disturbance,
      c) wet roadway with risk of aquaplaning having specular reflection type with greater disturbance than the disturbance corresponding to the normally wet roadway,
      d) snowy roadway having diffuse reflection type with disturbance, and
      e) icy roadway having specular reflection type without disturbance; and
wherein the vehicle comprises a partially or fully automated driving vehicle, the vehicle driving system further comprises an output unit, the output unit comprising digital electronic circuitry configured to at least one of alert a driver of the roadway condition classification by sending at least one control signal to display of the vehicle, the at least one control signal instructing the display to visually issue an alert based upon the roadway condition classification, or control a vehicle actuator to intervene in driving dynamics of the vehicle based upon the roadway condition.

21. The vehicle driving system according to claim 20, wherein the at least one of the alert of the driver of the roadway condition classification by sending the at least one control signal to the display of the vehicle, or the control the vehicle actuator to intervene in the driving dynamics of the vehicle based upon the roadway condition comprises the control of the vehicle actuator to intervene in the driving dynamics of the vehicle.

22. The system according to claim 16, wherein the at least one of initiate the alert to the driver of the roadway condition classification by controlling the warning apparatus to issue the alert based upon the roadway condition classification, or the initiation of the actuation of the vehicle actuator to intervene in the driving dynamics of the vehicle based upon the roadway condition classification comprises the initiation of the activation of the vehicle actuator to intervene in the driving dynamics of the vehicle.

23. The method according to claim 1, wherein the at least one of alerting the driver of the roadway condition classification by controlling the display of the vehicle to visually present the alert based upon the roadway condition classification, or controlling the vehicle actuator to intervene in driving dynamics of the vehicle based upon the roadway condition classification comprises controlling the vehicle actuator to intervene in driving dynamics of the vehicle based upon the roadway condition classification.

* * * * *